United States Patent [19]

Tanaka et al.

[11] Patent Number: 5,352,541
[45] Date of Patent: Oct. 4, 1994

[54] SLIDING MEMBER MADE OF ALUMINUM BEARING ALLOY HAVING EXCELLENT ANTI-SEIZURE PROPERTY

[75] Inventors: Tadashi Tanaka, Konan; Masaaki Sakamoto, Nagoya; Koichi Yamamoto, Komaki; Tsukimitsu Higuchi, Kani, all of Japan

[73] Assignee: Daido Metal Company Ltd., Nagoya, Japan

[21] Appl. No.: 949,377

[22] Filed: Sep. 23, 1992

Related U.S. Application Data

[62] Division of Ser. No. 751,417, Aug. 28, 1991, abandoned.

[30] Foreign Application Priority Data

Aug. 31, 1990 [JP] Japan .................. 2-228249

[51] Int. Cl.⁵ .................................. F16C 33/06
[52] U.S. Cl. .................. 428/628; 428/621; 428/653; 384/625; 384/907; 384/913
[58] Field of Search .............. 428/621, 628, 653; 384/625, 907, 913

[56] References Cited

U.S. PATENT DOCUMENTS

| | | | |
|---|---|---|---|
| 3,900,658 | 8/1975 | Fujii et al. | 428/422 |
| 3,935,797 | 2/1976 | Niimi et al. | 384/913 |
| 4,170,469 | 10/1979 | Mori | 428/652 |
| 4,266,660 | 5/1981 | Herman | 252/12 |
| 4,460,730 | 7/1984 | Koyama et al. | 524/420 |
| 4,471,030 | 9/1984 | Fukuoka et al. | 428/653 |
| 4,703,076 | 10/1987 | Mori | 524/420 |
| 4,836,395 | 6/1989 | Baureis et al. | 428/653 |
| 5,039,575 | 8/1991 | Mori et al. | 428/463 |
| 5,116,521 | 5/1992 | Fujii et al. | 252/18 |

FOREIGN PATENT DOCUMENTS

| | | |
|---|---|---|
| 3727468.6 | 8/1987 | Fed. Rep. of Germany . |
| 50-150647 | 5/1974 | Japan . |
| 57-14742 | 3/1982 | Japan . |
| 58-113627 | 7/1983 | Japan . |
| 58-123882 | 7/1983 | Japan . |
| 60-103186 | 6/1985 | Japan . |
| 64-49713 | 2/1989 | Japan . |
| 02-176269 | 7/1990 | Japan . |

OTHER PUBLICATIONS

Derwent Abstract of JP 58-113627, AN 83-737455/33, 1983.

*Primary Examiner*—John Zimmerman
*Assistant Examiner*—N. M. Nguyen
*Attorney, Agent, or Firm*—Browdy and Neimark

[57] ABSTRACT

An aluminum bearing alloy sliding member excellent in anti-seizure property, of which sliding surface is coated with a film of aluminum fluoride or manganese phosphate formed by a chemical conversion process and having a thickness ranging from 0.1 μm to 10 μm.

10 Claims, 1 Drawing Sheet

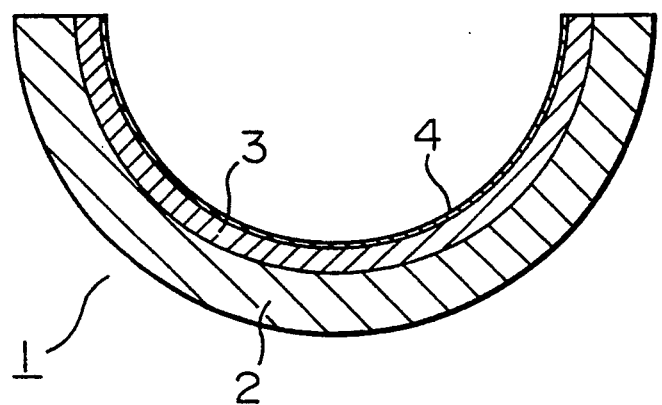

SLIDING MEMBER MADE OF ALUMINUM BEARING ALLOY HAVING EXCELLENT ANTI-SEIZURE PROPERTY

This application is a divisional, of application Ser. No. 07/751,417, filed Aug. 28, 1991 now abandoned.

BACKGROUND OF THE INVENTION

1. Field of the Invention

The present invention relates to a sliding member made of an aluminum (Al) bearing alloy having anti-seizure property and, more particularly, to a sliding member of the type mentioned above having a chemical conversion coating formed on the sliding surface thereof.

2. Background of the Invention

Aluminum bearing alloys have been known such as Al-Zn-Si-Cu-Pb system alloy (hereinafter referred to as "first alloy") disclosed in JP-B-57-14742 and an alloy which is prepared by adding one, two or more of Mg, Ni and Bi. These aluminum bearing alloys are usually used in such a state that surface coating films are formed thereon by electroplating but in some cases used without any surface coating according to alloy composition.

Aluminum bearing alloys having no surface coating, however, are often unsatisfactory in that they do not exhibit conformability and anti-seizure property with respect to the mating sliding members. On the other hand, formation of coating film by electroplating requires a strict control of plating solution, as well as a complicated processing.

SUMMARY OF THE INVENTION

Thus, an object of the present invention is to provide a sliding member made of an aluminum bearing alloy which exhibits good conformability and anti-seizure property and which is easy to form a surface coating film thereon.

To this end, according to the present invention, there is provided an aluminum bearing alloy sliding member excellent in anti-seizure property, of which sliding surface is coated with a film of aluminum fluoride formed by a chemical conversion process and having a thickness ranging from 0.1 μm to 10 μm.

According to another aspect, there is provided an aluminum bearing alloy sliding member excellent in anti-seizure property, of which sliding surface is coated with a film of manganese phosphate formed by a chemical conversion process and having a thickness ranging from 0.1 μm to 10 μm.

Aluminum bearing alloys are usually used in the form of composite bearing metals together with backing steel members integrated therewith by rolling. The backing steel member make it possible to reduce the thickness of the aluminum bearing alloy.

BRIEF DESCRIPTION OF THE DRAWING

The drawing is a sectional view of one example of the bearing alloy sliding member of the invention.

DETAILED DESCRIPTION OF THE INVENTION

A. Reasons of Limiting Thickness of Surface Coating:

According to the invention, the thickness of the surface coating film of aluminum fluoride or manganese phosphate is limited to fall within the range of from 0.1 μm and 10 μm. When the thickness of the film is below 0.1 μm, no appreciable effect is obtained in improving anti-seizure property, whereas the film thickness exceeding 10 μm undesirably allows the film to easily exfoliate.

B. Chemical Conversion Process (a) The chemical conversion process conducted in accordance with the present invention includes, for example, the steps of: degreasing the surface of a member made of the aluminum bearing alloy, rinsing the surface of the member with water, dipping the member in a bath of aluminum fluoride of a temperature not lower than 98° C. so as to form an aluminum fluoride film, rinsing in water of 40° to 60° C., and drying. Many types of chemical conversion agents usable in this process are on the market and an example of such agents is shown in the following description of Examples.

(b) Another example of the chemical conversion process includes, for example, the steps of: degreasing the surface of a member made of the aluminum bearing alloy, rinsing the surface of the member with water, dipping the member in a bath of manganese phosphate of a temperature ranging from 80° C. to 100° C. so as to form a manganese phosphate film, rinsing in warm water of 40° to 60° C., and drying. Many types of chemical conversion agents usable in this process are on the market and an example of such agents is shown in the following description of Examples.

EXAMPLES (a) An aluminum bearing alloy consisting of 3.5% of Zn, 2.5% of Si, 0.8% of Cu and the balance being essentially Al was molten, cast and rolled into a sheet which was then superposed on a steel sheet as a backing metal. These sheets were then integrated through rolling so as to form a composite sheet. The composite sheet was then formed by a bearing forming machine into a composite slide bearing member having a semi-circular cross-section of 53 mm in inside radius, 13 mm in width, 1.5 mm in bearing thickness and 0.3 mm in bearing alloy thickness. The thus formed-bearing member was dipped into a bath of aluminum fluoride which was an aqueous solution containing 3 wt% of aluminum fluoride (an aluminum fluoride chemical conversion agent commercially available from Nihon Parkerizing K. K. in the name of Alubond A) and containing also sodium silicon fluoride and zinc fluoride, whereby an aluminum fluoride coating film of 3 to 4 μm thick was formed on the sliding surface of the aluminum bearing alloy of the bearing member. The sample of the bearing member thus prepared is hereinafter referred to as Sample No. 1. The drawing shows the thus obtained half shell bearing 1 which consists of a backing metal layer of steel 2, a bearing alloy layer 3 and the coated film 4.

(b) An aluminum bearing alloy consisting of 6% of Sn, 1% of Cu, 1% of Ni and the balance being essentially Al was molten, cast and rolled into a sheet which was then superposed on a steel sheet as a backing metal. These sheets were then integrated through rolling so as to form a composite sheet. This composite sheet was then formed by a bearing forming machine into a composite slide bearing member having a semi-circular cross-section of 53 mm in inside radius, 13 mm in width, 1.5 mm in bearing thickness and 0.3 mm in bearing alloy thickness. The thus formed bearing member was dipped into a bath of manganese phosphate which was an aqueous solution containing 14 wt% of manganese phosphate (a manganese-phosphatizing chemical conversion agent commercially available from Nihon Parkerizing K. K. in the name of Balphos M1A) and containing also phosphoric acid, manganese, nitric acid and a trace of iron, whereby a manganese phosphate film of 1 to 2 μm thick was formed on the sliding surface of the aluminum bearing alloy of the bearing member. The sample of the bearing member thus prepared is hereinafter referred to Sample No. 2.

(c) Comparative bearing members as Sample Nos. 3 and 4, respectively, were prepared by the same processes as Sample Nos. 1 and 2, except that no chemical conversion treatment was conducted.

(d) The bearing member Sample Nos. 1 to 4 were subjected to a seizure test which was conducted under the conditions shown in Table 1, of which results were shown in Table 2.

TABLE 1

Testing Conditions
Testing method: Static load seizure test

| Rotation speed | 3600 rpm | Amount of oil supplied | 12.5 C.C./min. |
|---|---|---|---|
| Circumferential speed | 10 m/sec | Lubricating oil | JIS SAE20 |
| Oil temperature | 98–102° C. | Material of shaft | JIS S55C |

Method of finding the seizure:
Occurrence of seizure was detected in terms of the bearing temperature at the backside reaching 200° C. or higher or in terms of overload of the motor.

Evaluation of the test results

The bearing member of Sample No. 1 having aluminum fluoride coat could sustain the specific load up to 1,150 kgf/cm² without seizure, while Sample No. 3 having the same alloy composition but having no coat could bear only 1,000 kgf/cm² at the maximum. Similarly, the bearing member of

TABLE 2

| Sample No. | Kind of chemical conversion coating | Alloy composition (wt %) | Max. seizure-free specific load (kgf/cm²) |
|---|---|---|---|
| 1 | Aluminum fluoride | Zn:3.5%, Si:2.5%, Cu:0.8%, balance Al | 1,150 |
| 2 | Manganese phosphate | Sn:6%, Cu:1%, Ni:1%, balance Al | 1,200 |
| 3 | No coating | Zn:3.5%, Si:2.5%, Cu:0.8%, balance Al | 1,000 |
| 4 | No coating | Sn:6%, Cu:1%, Ni:1%, balance Al | 1,050 |

Sample No. 2 having manganese phosphate coat could sustain surface the specific load up to 1,200 kgf/cm² without seizure, while Sample No. 4 having the same alloy composition but having no coating could bear only 1,050 kgf/cm² at the maximum.

As will be apparent from the above, according to the present invention, there is provided an aluminum bearing alloy sliding member excellent in anti-seizure property, of which sliding surface is coated with a film of aluminum fluoride formed by a chemical conversion process and having a thickness ranging from 0.1 μm to 10 μm. There is also provided an aluminum bearing alloy sliding member excellent in anti-seizure property, of which sliding surface is coated with a film of manganese phosphate formed by a chemical conversion process and having a thickness ranging from 0.1 μm to 10 μm.

According to the present invention, the following advantageous effects are obtained:

(a) The chemical conversion coating film formed on the sliding surface of the aluminum bearing alloy prevents the bearing alloy from directly contacting the mating sliding member and improves the initial conformability with the mating sliding member.

(b) The chemical conversion coating film is porous, therefore it well retains lubricating oil so as to improve anti-seizure property.

(c) The chemical conversion coating film can be formed without requiring any strict control of solution such as that required in electroplating and without necessitating any complicated process.

What is claimed is:

1. An aluminum bearing alloy sliding member comprising an aluminum alloy sliding member body having a sliding surface of said aluminum alloy coated with a film consisting essentially of aluminum fluoride formed by a chemical conversion process and having a thickness ranging from 0.1 μm to 10 μm.

2. An aluminum bearing alloy sliding member according to claim 1, comprising a backing metal sheet integrated with an aluminum bearing alloy layer.

3. The sliding member according to claim 2 wherein said backing metal sheet is made of steel.

4. A sliding member of a composite sheet which is produced by rolling an aluminum bearing alloy sheet with a backing metal sheet previously superimposed on each other, wherein the sliding surface of the aluminum bearing alloy layer is coated with a film consisting essentially of aluminum fluoride formed by a chemical conversion process and having a thickness ranging from 0.1 μm to 10 μm.

5. An aluminum bearing alloy sliding member according to claim 1 wherein said aluminum bearing alloy comprises Al, Zn, Si, Cu and Pb.

6. An aluminum bearing alloy sliding member according to claim 5, wherein said aluminum bearing alloy further comprises at least one of Mg, Ni and Bi.

7. An aluminum bearing alloy sliding member according to claim 3 in the form of a composite slide bearing member having a semi-circular cross-section.

8. An aluminum bearing alloy sliding member in accordance with claim 7, wherein said aluminum bearing alloy consists essentially of Zn, Si, Cu and the balance essentially Al.

9. An aluminum bearing alloy sliding member according to claim 7 wherein said aluminum bearing alloy consists essentially of Sn, Cu, Ni and the balance being essentially Al.

10. An aluminum bearing alloy sliding member according to claim 1, wherein said aluminum fluoride film is porous.

* * * * *